United States Patent
Chen et al.

(10) Patent No.: US 8,181,037 B2
(45) Date of Patent: May 15, 2012

(54) APPLICATION PROTECTION SYSTEMS AND METHODS

(75) Inventors: Rui-Hwa Chen, Taipei County (TW); Heng-Ho Wu, Taipei County (TW)

(73) Assignee: Via Technologies, Inc., Hsin-Tien, Taipei (TW)

(*) Notice: Subject to any disclaimer, the term of this patent is extended or adjusted under 35 U.S.C. 154(b) by 914 days.

(21) Appl. No.: 11/854,579

(22) Filed: Sep. 13, 2007

(65) Prior Publication Data
US 2008/0235518 A1 Sep. 25, 2008

(30) Foreign Application Priority Data
Mar. 23, 2007 (TW) .............................. 96110107 A

(51) Int. Cl.
*G06F 11/30* (2006.01)
(52) U.S. Cl. ............ 713/189; 713/194; 726/16; 726/17; 726/19; 726/21; 380/44
(58) Field of Classification Search .................. 713/189; 726/16–21; 380/44
See application file for complete search history.

(56) References Cited

U.S. PATENT DOCUMENTS

| | | | | |
|---|---|---|---|---|
| 4,742,426 A * | 5/1988 | Lavelle | ......................... | 361/171 |
| 7,043,636 B2 * | 5/2006 | Smeets | ......................... | 713/170 |
| 7,644,278 B2 * | 1/2010 | Catherman et al. | ........... | 713/175 |
| 2002/0065992 A1 * | 5/2002 | Chauvel et al. | ............... | 711/141 |
| 2003/0097578 A1 * | 5/2003 | England et al. | ............... | 713/191 |
| 2004/0039924 A1 * | 2/2004 | Baldwin et al. | ............... | 713/189 |
| 2005/0137889 A1 * | 6/2005 | Wheeler | ......................... | 705/1 |
| 2005/0280500 A1 * | 12/2005 | Miller et al. | ................. | 340/5.55 |
| 2006/0059547 A1 * | 3/2006 | Deloume | ......................... | 726/9 |
| 2006/0259782 A1 * | 11/2006 | Wang et al. | ................... | 713/189 |
| 2007/0235517 A1 * | 10/2007 | O'Connor et al. | ............ | 235/375 |
| 2008/0022129 A1 * | 1/2008 | Durham et al. | ............... | 713/189 |
| 2010/0100724 A1 * | 4/2010 | Kaliski, Jr. | ..................... | 713/155 |

FOREIGN PATENT DOCUMENTS

TW 200704103 1/2007

* cited by examiner

*Primary Examiner* — Nabil El Hady
(74) *Attorney, Agent, or Firm* — Thomas|Kayden

(57) ABSTRACT

Application protection systems and methods. The system comprises a security platform device comprising a storage unit and a processing unit. The storage unit comprises a root security key and an application security key. The security platform device receives a unique key from an application. The processing unit encrypts the unique key using the root security key, and determines whether the encrypted unique key conforms to the application security key. If so, the application is allowed to execute.

12 Claims, 7 Drawing Sheets

APPLICATION PROTECTION SYSTEMS AND METHODS

BACKGROUND OF THE INVENTION

1. Field of the Invention

The disclosure relates generally to application protection systems and methods, and, more particularly to application protection systems and methods providing hardware protection mechanisms.

2. Description of the Related Art

For intellectual property rights protection, some applications offer limited use on specific devices to avoid being copied and used on different hosts. The applications often use hardware protection mechanisms. Conventionally, hardware protection mechanisms integrate with a dongle (keypro) or a TPM (Trusted Platform Module) to avoid applications from being used on different hosts.

For a dongle, verification data such as license information or a serial number corresponding to an application is recorded in the dongle. The dongle couples to a host with installed application. When the application is executed, the application first reads data from the dongle, and determines whether the data in the dongle is valid. If so, the application continues to execute. If not, the application is not allowed to execute. The TPM is installed on the motherboard of a host. The TPM stores a credential or a key. Similarly, the credential or key can be used to determine whether to execute an application.

For conventional application protection mechanisms, the dongle or protection codes in the application are easily removed. Further, the dongle is prone to be lost or taken out by others. Additionally, since TPM request BIOS (Basic Input Output System) support, most current hosts need to constantly upgrade its BIOS to support TPM. Thus, causing inconvenience for users and manufacturers.

BRIEF SUMMARY OF THE INVENTION

Application protection systems and methods are provided.

An embodiment of an application protection system comprises a security platform device. The security platform device comprises a storage unit and a processing unit. The storage unit comprises a root security key and an application security key. The security platform device receives a unique key from an application. The processing unit encrypts the unique key using the root security key, and determines whether the encrypted unique key conforms to the application security key. If so, the application is allowed to execute.

In an embodiment of an application protection method for use in a security platform device comprising a root security key and an application security key, a unique key is received from an application. The unique key is encrypted using the root security key. It is determined whether the encrypted unique key conforms to the application security key. If so, the application is allowed to execute.

Application protection systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Application protection systems and methods are provided.

Figure 1:
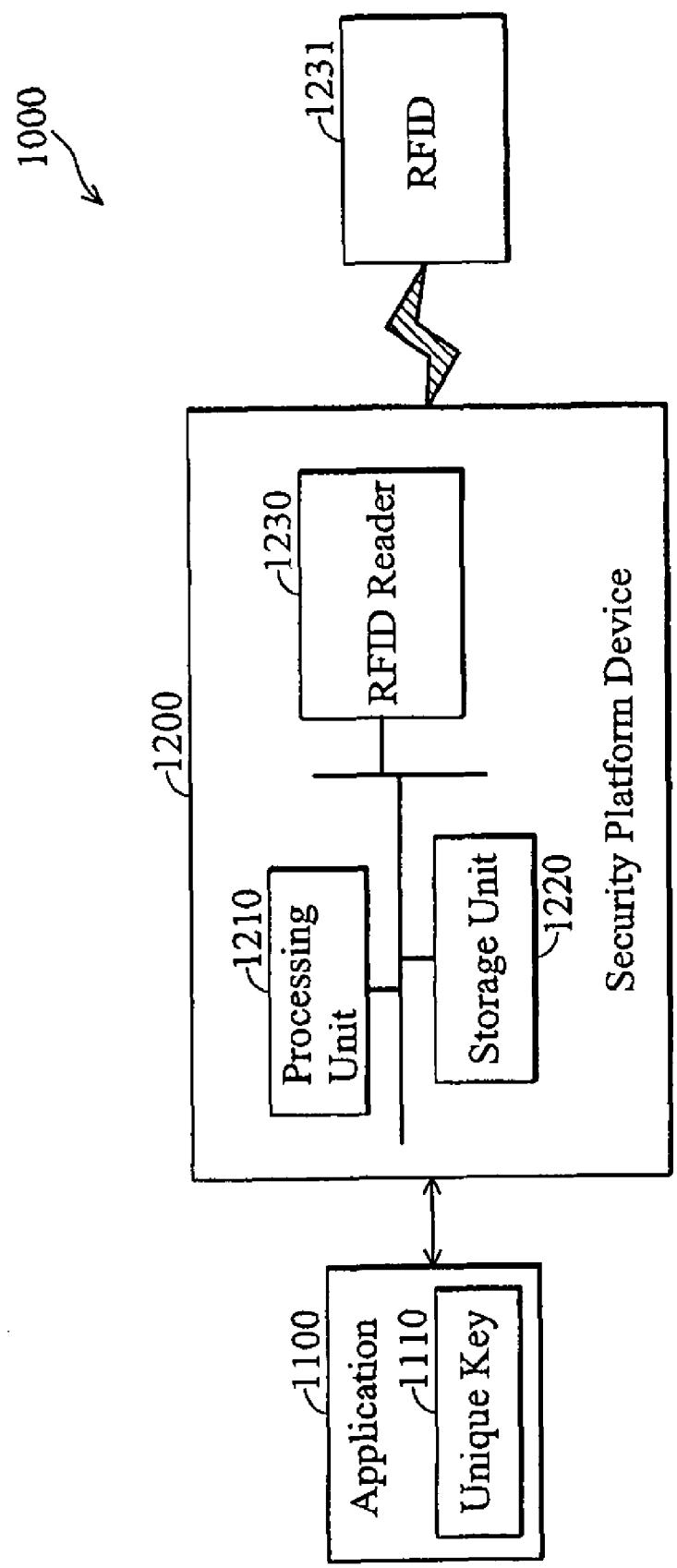
FIG. 1 is a schematic diagram illustrating an embodiment of an application protection system.

FIG. 1 is a schematic diagram illustrating an embodiment of an application protection system.

As shown in FIG. 1, the application protection system 1000 comprises an application 1100 and a security platform device 1200. It is understood that the security platform device 1200 couples to a host (not shown) with the installed application 1100. In some embodiments, the host may be a personal computer or a server, comprising operation units, memory, and others. The host can execute various applications, and achieve designed purposes of the applications. The security platform device 1200 may couple to the connection port of the host, or be set on the motherboard of the host. The security platform device 1200 comprises a processing unit 1210, a storage unit 1220, and a RFID (Radio Frequency Identification) reader 1230. The processing unit 1210 performs the application protection methods, and related detailed descriptions are discussed later.

Figure 2:
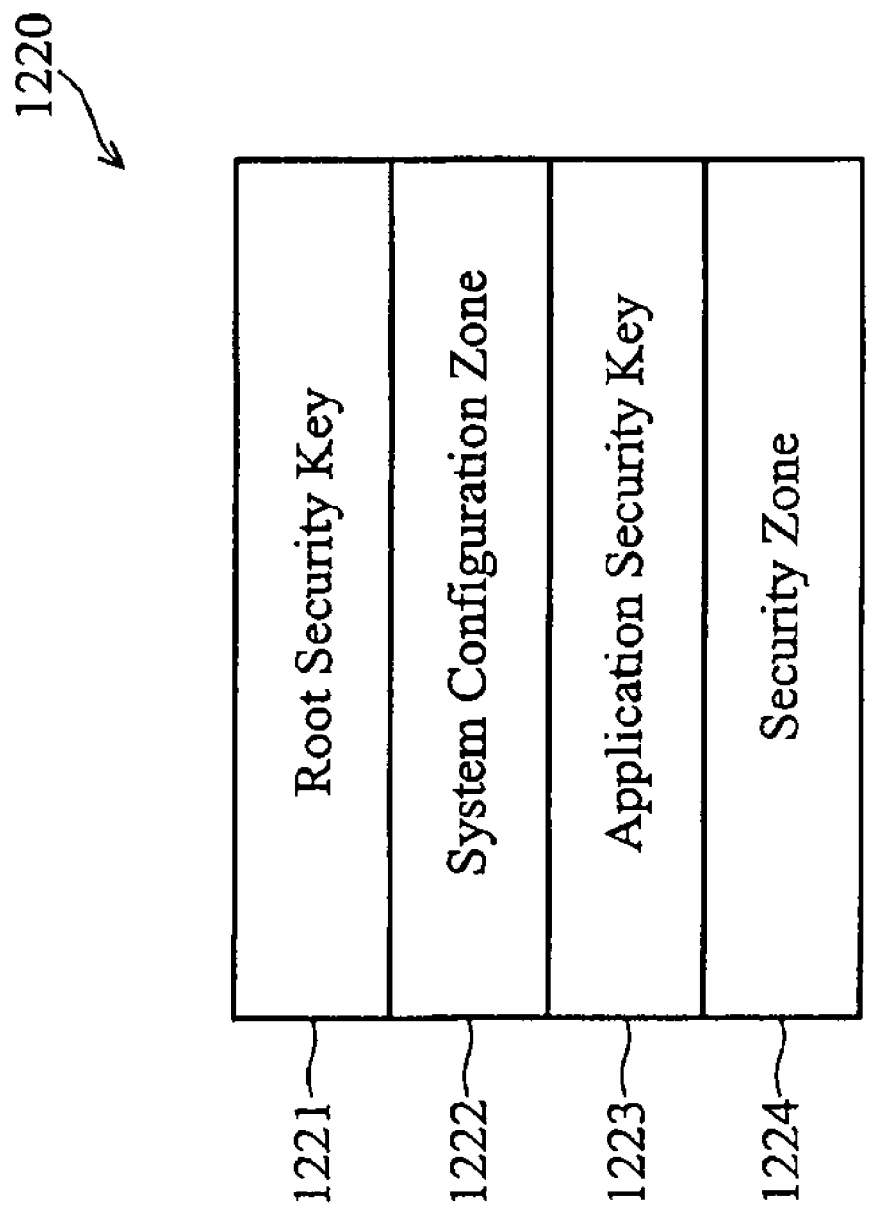
FIG. 2 is a schematic diagram illustrating an embodiment of a storage unit.

The storage unit 1220 stores related data for the application 1100 and the security platform device 1200. FIG. 2 is a schematic diagram illustrating an embodiment of a storage unit. The storage unit 1220 comprises a root security key 1221, a system configuration zone 1222, an application security key 1223, and a security zone 1224. The root security key 1221 is pre-programmed in the factory. The application 1100 cannot access the root security key 1221. The system configuration zone 1222 comprises system information such as system mode, RFID information, a verification counter, settings for event triggers, and others. More detail of the system information is discussed later. The application 1100 comprises a unique key 1110. Initially, the application 1100 transmits the unique key 1110 to the security platform device 1200. The processing unit 1210 encrypts the unique key 1110 using the root security key 1221 to obtain an application security key 1223, and stores the application security key 1223 to the storage unit 1220. After the application security key 1223 is obtained, data must first be encrypted using the application security key 1223, and then stored to the security zone 1224.

As described, the system configuration zone 1222 of the storage unit 1220 comprises settings for event triggers. The settings for event triggers may be set by the application. In some embodiments, the data structure of the settings may comprise an initial action field, a periodic field, a failure action field, and a time field. For example, the initial action field may be 2 bits for setting of system wake up, shutdown, sanity check or RFID update. The periodic field may be 2 bits for setting of specific time, daily, weekly or monthly. The failure action field may be 3 bits for setting of nothing, sanity check, time bomb, lock or shutdown. The time field may be 16 bits for time setting.

The RFID reader 1230 generates a security RF value periodically such as every N minutes and/or in response to an event trigger, and updates the RFID 1231 accordingly. The security RF value is generated according to a current timestamp and/or a checksum. In some embodiments, the processing unit 1210 can generate the security RF value according to an equation: E(TS,CS), where TS is the current timestamp, CS is the checksum, and E is an encryption function with the root security key 1221. The RFID reader 1230 also reads the RFID 1231.

Figure 3:
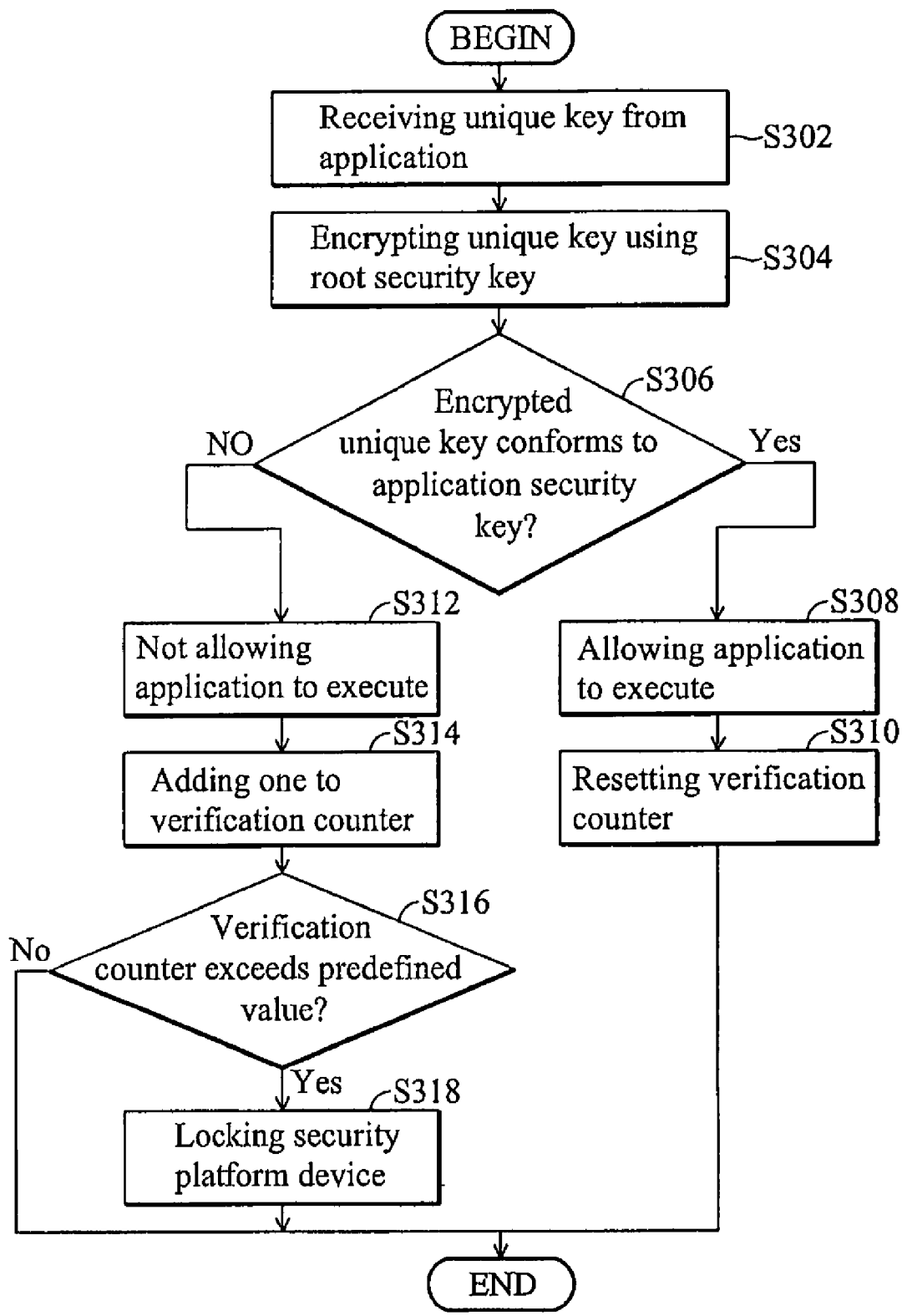
FIG. 3 is a flowchart of an embodiment of an application protection method.

FIG. 3 is a flowchart of an embodiment of an application protection method.

In step S302, the security platform device receives a unique key from an application. In step S304, the unique key is encrypted using a root security key of the security platform device. In step S306, it is determined whether the encrypted unique key conforms to an application security key of the security platform device which is previously obtained through encrypting the unique key 1110 using the root security key 1221. If so (Yes in step S306), in step S308, the application is allowed to execute, and in step S310, a verification counter in the security platform device is reset. If not (No in step S306), in step S312, the application is not allowed to execute, and in step S314, the verification count is added by one. Thereafter, in step S316, it is determined whether the verification counter exceeds a predefined value. If not (No in step S316), the procedure is completed. If so (Yes in step S316), in step S318, the system mode of the security platform device is switched to a lock mode, that is the security platform device is locked.

Figure 4:
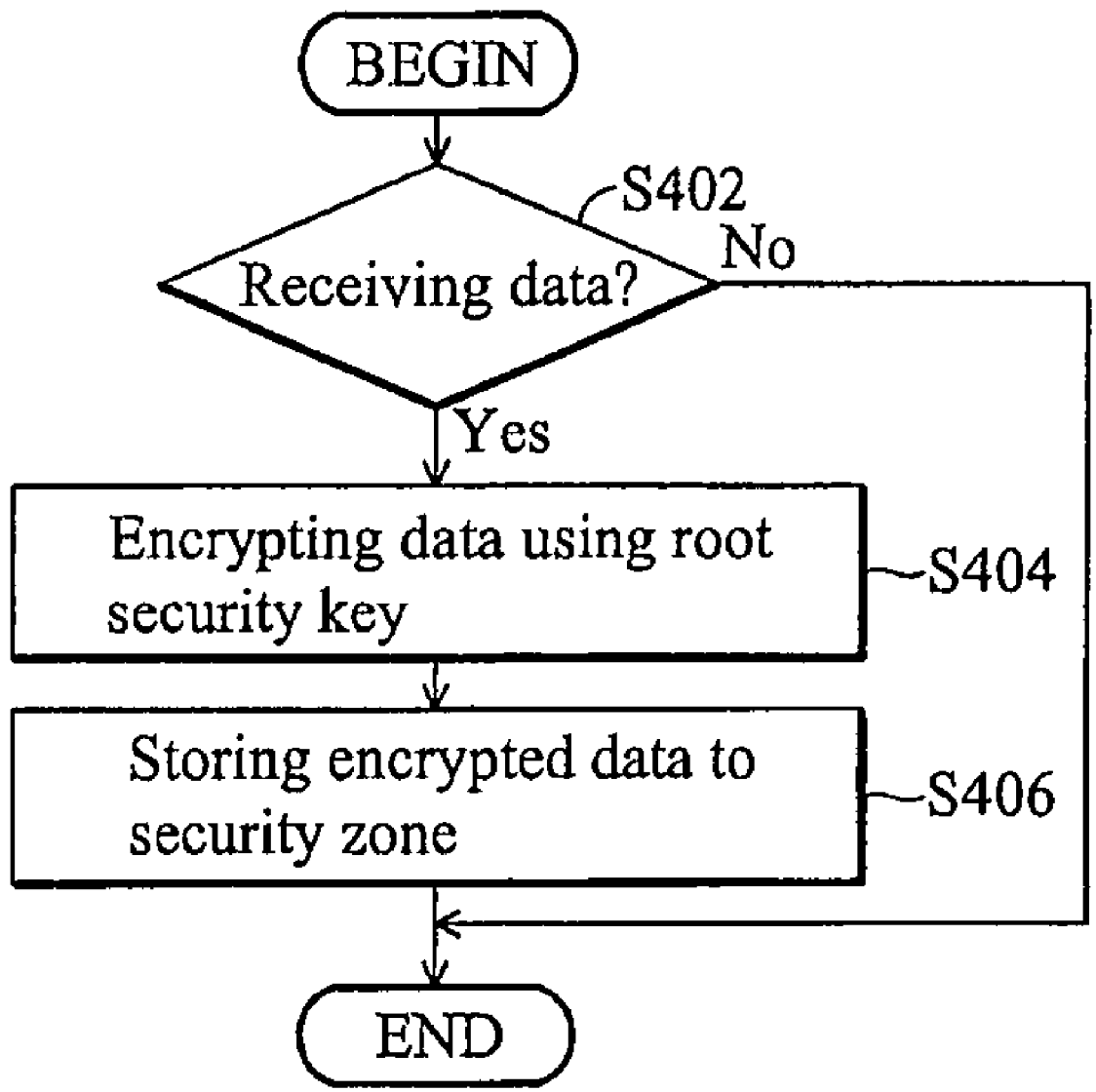
FIG. 4 is a flowchart of an embodiment of a data storage method.

FIG. 4 is a flowchart of an embodiment of a data storage method.

In step S402, the security platform device determines whether data is received from the application. If not (No in step S402), the procedure is completed. If so (Yes in step S402), the data is received from the application. In step S404, the data is encrypted using the root security key of the security platform device. In step S406, the encrypted data is stored to the security zone of the storage unit.

Figure 5:
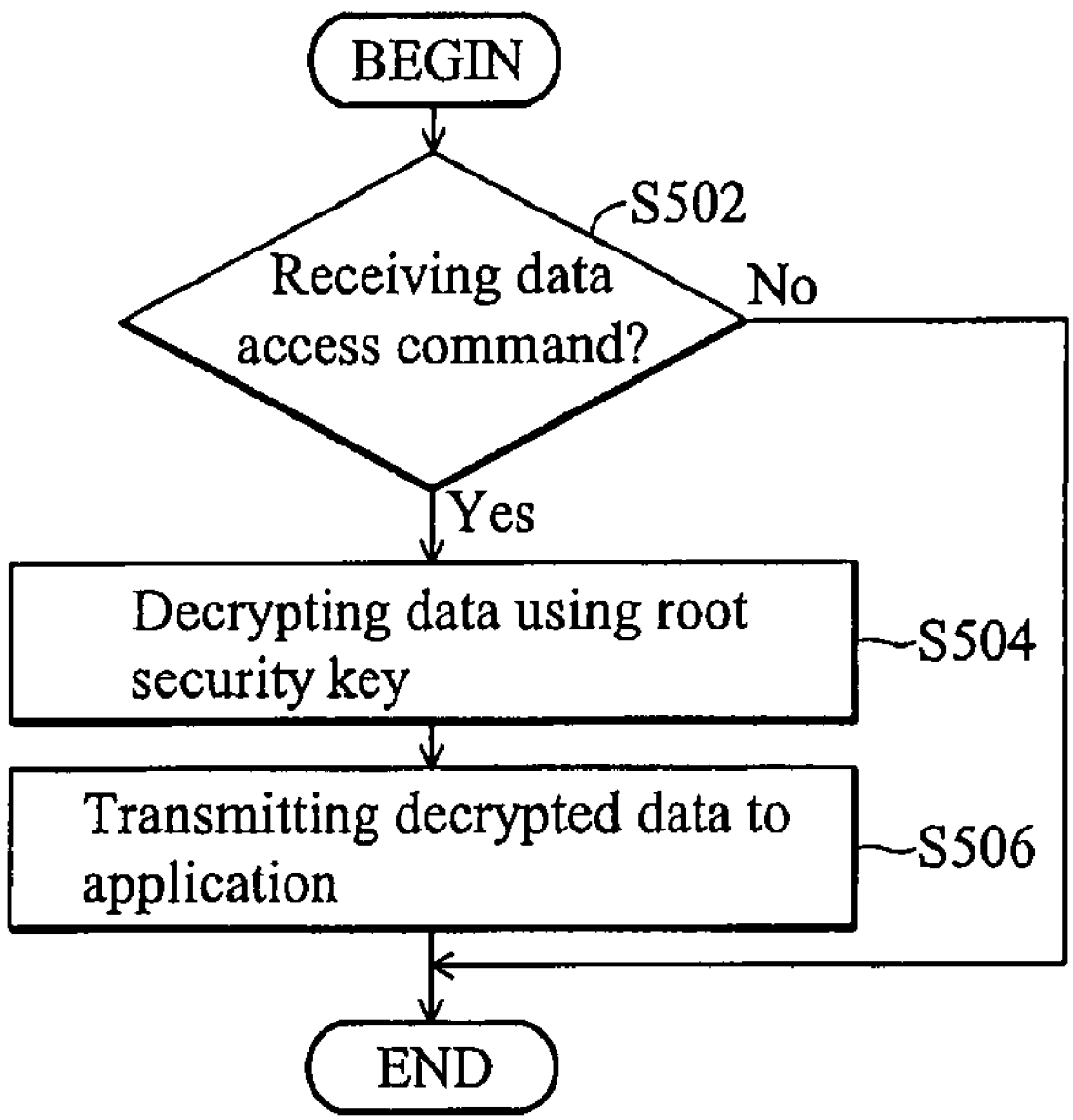
FIG. 5 is a flowchart of an embodiment of a data access method.

FIG. 5 is a flowchart of an embodiment of a data access method.

In step S502, the security platform device determines whether a data access command is received from the application. If not (No in step S502), the procedure is completed. If so (Yes in step S502), the data access command is received from the application. In step S504, data designated by the data access command is read from the security zone of the storage unit, and decrypted using the root security key of the security platform device. In step S506, the decrypted data is transmitted to the application.

Figure 6:
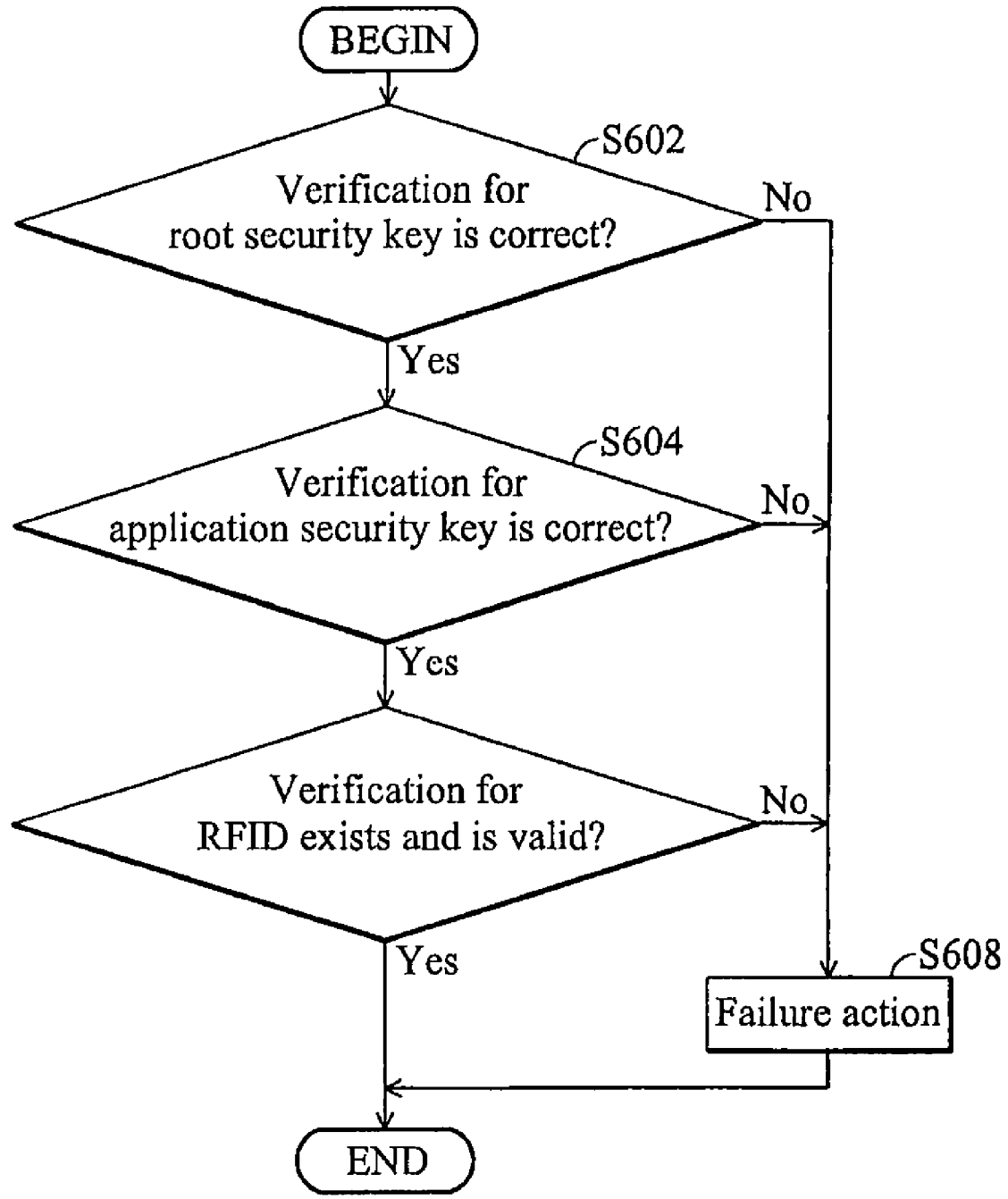
FIG. 6 is a flowchart of an embodiment of a method for sanity check.

FIG. 6 is a flowchart of an embodiment of a method for sanity check. It is understood that the sanity check is performed when the host installing the application or the security platform device boots, and/or when specific events are triggered.

In step S602, the root security key of the security platform device is verified to ensure whether it is correct. In some embodiments, the root security key can be verified using a specific equation. If the verification fails (No in step S602), in step S608, a failure action is performed. It is noted that the failure action is discussed later. If the verification passes (Yes in step S602), in step S604, the application security key of the security platform device is verified to ensure whether it is correct. In some embodiments, the application security key can be verified using a hash function. If the verification fails (No in step S604), in step S608, a failure action is performed. If the verification passes (Yes in step S604), in step S606, the RFID is verified to determine whether the RFID exists, and is valid. If the RFID does not exist or is not valid (No in step S606), in step S608, a failure action is performed. If the verification of the RFID passes (Yes in step S606), the procedure is completed.

Figure 7:
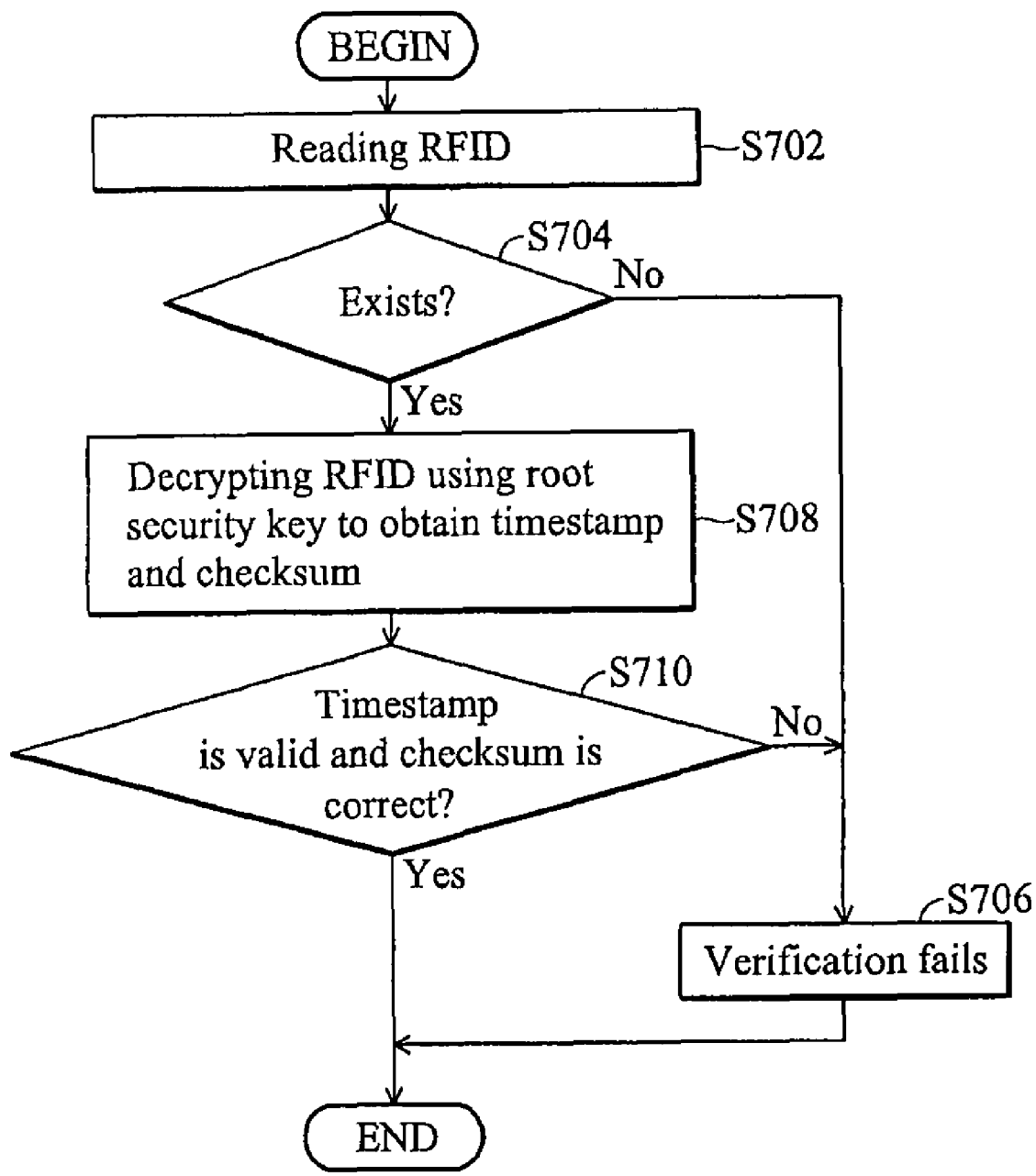
FIG. 7 is a flowchart of an embodiment of a method for RFID verification.

FIG. 7 is a flowchart of an embodiment of a method for RFID verification.

In step S702, the security platform device reads an external RFID. If no RFID can be read (No in step S704), in step S706, the verification fails. If the RFID exists and is read (Yes in step S704), in step S708, the RFID is decrypted using the root security key of the security platform device to obtain a timestamp and a checksum. In step S710, it is determined whether the timestamp is valid, and the checksum is correct. In some embodiments, the security platform device has a predefined time interval such as M minutes, and determines the timestamp is valid by determining whether the timestamp falls into the predefined time interval. If the timestamp is not valid or the checksum is not correct (No in step S710), in step S706, the verification fails.

It is understood that the failure action may cause the security platform device to enter different system modes. In some embodiments, the failure actions may lock the security platform device, suspend the security platform device, shutdown the security platform device, cause the security platform device to sleep a predefined time, delete the application security key in the security platform device, or set a time bomb in the security platform device, where the security platform device will be destroyed when a specific time set by the time bomb presents. It is understood that when the security platform device is set with a time bomb, the application may provide a correct application security key to defuse the time bomb within a predetermined period. When the security platform device is locked, the security platform device stops outputting the data in the storage unit to ensure the data security of the security platform device. At which time, the application may provide a specific unlock key to the security platform device. The security platform device will unlock itself when the unlock key is received. Additionally, when the security platform device sleeps, the application may provide a specific wake up command to the security platform device. The security platform device will return to a normal state when the wake up command is received.

Therefore, applications can be protected using the systems and methods of the inventions. Applications can store specific data with encryption in the security platform device to further ensure data security. Additionally, a valid state of the security platform device can be ensured using RFID to further protect applications.

Application protection systems and methods, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a generalpurpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Thus, the scope of the invention shall be defined and protected by the following claims and their equivalents.

What is claimed is:

1. An application protection system, comprising:
a security platform device comprising:
   a storage unit comprising a root security key and an application security key, wherein the root security key is pre-programmed while the security platform device is manufactured;
   a processing unit receiving a unique key from an application, encrypting the unique key using the root security key, determining whether the encrypted unique key conforms to the application security key, and if so, allowing the application to execute; and
   a Radio Frequency Identification (RFID) reader updating an external RFID according to a security RF value encrypted by the root security key, and reading the security RF value from the external RFID during sanity checks.

2. The system of claim 1 wherein the storage unit further comprises a verification counter, and the processing unit resets the verification counter when the encrypted unique key conforms to the application security key.

3. The system of claim 1 wherein the storage unit further comprises a verification counter, and the processing unit does not allow the application to execute and adds one to update the verification counter when the encrypted unique key does not conform to the application security key.

4. The system of claim 1 wherein the security platform device further receives data from the application, the processing unit encrypts the data using the root security key, and stores the encrypted data to the storage unit.

5. The system of claim 1 wherein the security platform device further receives a data access command designating specific data from the application, the processing unit decrypts the specific data using the root security key, and transmits the decrypted specific data to the application.

6. The system of claim 1 wherein the security RF value is generated according to a function of a timestamp and a checksum.

7. An application protection method for use in a security platform device comprising a root security key and an application security key, comprising:
receiving a unique key from an application;
   encrypting the unique key using the root security key, wherein the root security key is pre-programmed while the security platform device is manufactured;
   determining whether the encrypted unique key conforms to the application security key;
   reading an external RFID;
   performing a sanity check by decrypting the external RFID using the root security key to obtain a security RF value and determining whether the security RF value is valid; and
if so, allowing the application to execute.

8. The method of claim 7 further comprising resetting a verification counter of the security platform device when the encrypted unique key conforms to the application security key.

9. The method of claim 7 further comprising not allowing the application to execute, and updating a verification counter of the security platform device by adding one if the encrypted unique key does not conform to the application security key.

10. The method of claim 9 further comprising:
determining whether the verification counter exceeds a predefined value; and
if so, locking the security platform device.

11. The method of claim 7 further comprising:
receiving data from the application;
encrypting the data using the root security key; and
storing the encrypted data to the storage unit.

12. The method of claim 7 further comprising:
receiving a data access command designating specific data from the application;
decrypting the specific data using the root security key; and
transmitting the decrypted specific data to the application.

* * * * *